(12) United States Patent
Kamezawa et al.

(10) Patent No.: US 6,469,864 B2
(45) Date of Patent: *Oct. 22, 2002

(54) DISK DRIVE HAVING A RESIN COVER IMPROVED IN ELECTROMAGNETIC PROTECTION CHARACTERISTICS

(75) Inventors: Hideaki Kamezawa; Takashi Matsumoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,051

(22) Filed: Dec. 9, 1998

(65) Prior Publication Data

US 2001/0015869 A1 Aug. 23, 2001

(30) Foreign Application Priority Data

Jun. 18, 1998 (JP) ............................................. 10-171142

(51) Int. Cl.[7] ........................... G11B 17/00; G11B 5/012
(52) U.S. Cl. .................................................... 360/97.01
(58) Field of Search ........................... 360/97.01, 97.02; 369/75.1, 263

(56) References Cited

U.S. PATENT DOCUMENTS

| | | | | |
|---|---|---|---|---|
| 5,007,946 A | * | 4/1991 | Babini ........................ 55/501 |
| 5,214,549 A | | 5/1993 | Baker et al. .............. 360/97.02 |
| 5,243,495 A | | 9/1993 | Read et al. .................. 361/685 |
| 5,282,100 A | | 1/1994 | Tacklind et al. ......... 360/97.02 |
| 5,363,260 A | * | 11/1994 | Kawakami ................ 360/97.01 |
| 5,461,523 A | * | 10/1995 | Hoshi ....................... 360/99.12 |
| 5,598,306 A | * | 1/1997 | Frees et al. .............. 360/97.02 |
| 5,600,509 A | | 2/1997 | Kawakami ................ 360/97.02 |
| 5,654,847 A | * | 8/1997 | Yagi et al. ................ 360/97.02 |
| 5,666,239 A | | 9/1997 | Pottebaum ................ 360/97.03 |
| 5,677,811 A | * | 10/1997 | Kuno et al. ............... 360/97.01 |
| 5,739,970 A | | 4/1998 | Kobayashi et al. ........... 360/75 |
| 5,798,885 A | * | 8/1998 | Saiki et al. ............... 360/77.08 |
| 5,875,067 A | * | 2/1999 | Morris et al. ............ 360/97.01 |
| 5,953,188 A | * | 9/1999 | Higuchi et al. .............. 360/137 |
| 6,023,392 A | * | 2/2000 | Kim ........................ 360/97.01 |
| 6,034,841 A | * | 3/2000 | Albrecht et al. ......... 360/97.01 |
| 6,233,110 B1 | * | 5/2001 | Suzuki ......................... 360/60 |

FOREIGN PATENT DOCUMENTS

| | | | |
|---|---|---|---|
| DE | 19544943 | * | 6/1996 |
| JP | 59124193 | | 7/1984 |
| JP | 06236674 | * | 8/1994 |
| JP | 7007284 | | 1/1995 |
| JP | 8139484 | | 5/1996 |
| WO | 9411873 | | 5/1994 |

* cited by examiner

Primary Examiner—Robert S. Tupper
Assistant Examiner—Julie Anne Watko
(74) Attorney, Agent, or Firm—Greer, Burns & Crain, Ltd.

(57) ABSTRACT

A disk drive includes a housing having a base and a cover fixed to the base, a disk rotatably mounted in the housing and having a plurality of tracks, a head for reading/writing data on the disk, and an actuator for moving the head across the tracks of the disk. The cover is composed of a molded resin and a metal sheet integrally embedded in the molded resin.

7 Claims, 6 Drawing Sheets

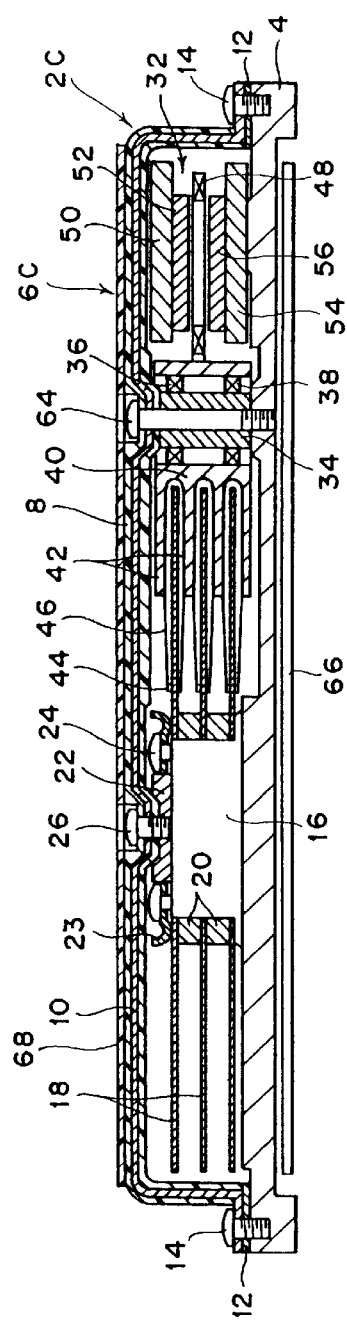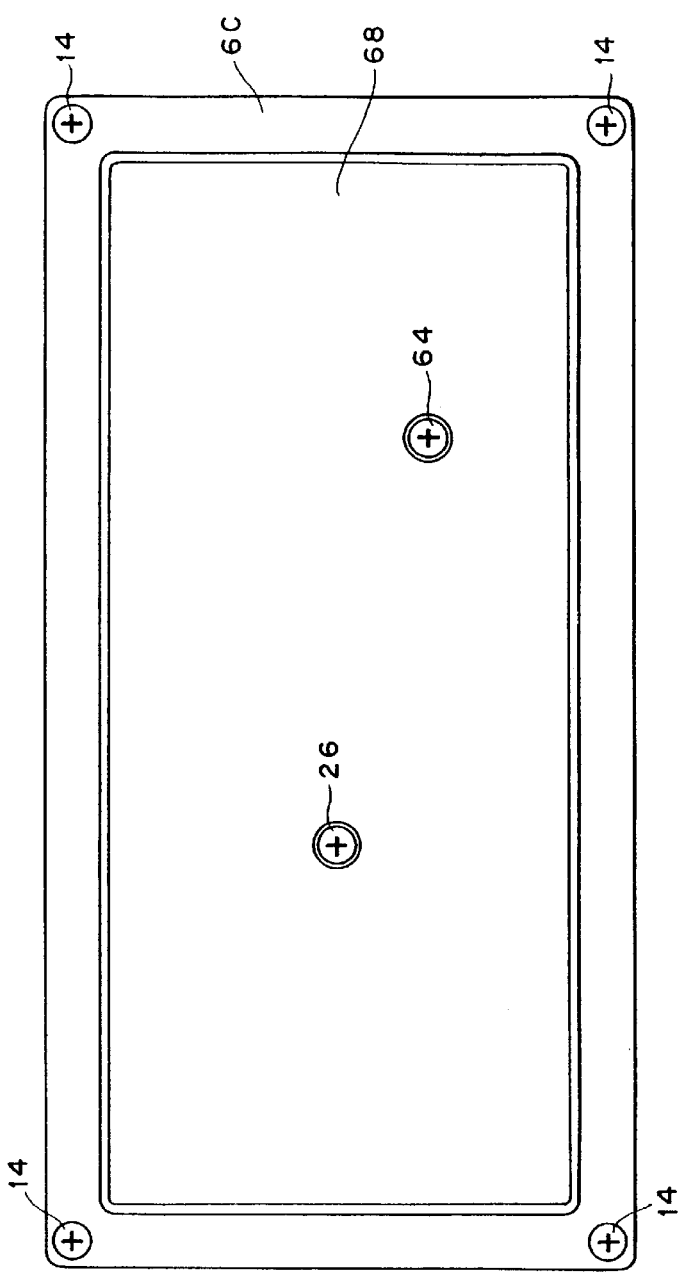
FIG. 4A
FIG. 4B

DISK DRIVE HAVING A RESIN COVER IMPROVED IN ELECTROMAGNETIC PROTECTION CHARACTERISTICS

BACKGROUND OF THE INVENTION

1. Field of the Invention

The present invention relates generally to a magnetic disk drive, and more particularly to a cover structure of the magnetic disk drive.

2. Description of the Related Art

In a magnetic disk drive for a computer, a contact start and stop (CSS) system is generally adopted as the relation between a magnetic head and a magnetic disk. This system is such that while the disk is rotating, the head is kept flying above the disk at a microscopic height owing to the balance between a flying force applied to the head by an air flow generated by high-speed rotation of the disk and an elastic force of a suspension pressing the head on the disk. When the disk rotation is stopped, the head is moved to a contact zone formed on the disk and comes into contact with the disk at the contact zone. While the disk is at rest, the head and the disk are kept in contact with each other.

As mentioned above, the head is kept flying above the disk at a microscopic height during rotation of the disk. Accordingly, there is a possibility of a head crash or the like due to of dust or the like. To cope with this problem, the magnetic disk and the magnetic head for reading/writing data on the disk are enclosed in a sealed housing (disk enclosure). The housing is composed of a base and a cover fixed through a packing to the base by a plurality of screws. The cover of a conventional magnetic disk drive is a cast cover manufactured primarily by aluminum die casting. A metal sheet is mounted on the cover to reduce noise.

However, it is difficult to accurately manufacture an aluminum cast cover having a complicated shape. It has accordingly been considered using resin for the cover material because of its good moldability, thereby realizing a complicated shape. However, such a resin-only cover is inferior in its electromagnetic shielding effect to a metal cover, causing the possibility of a malfunction or the like of the disk drive due to external electromagnetic waves. Further, the resin-only cover is lighter in weight than the metal cover, causing an increase in noise from the disk drive. Thus, the resin-only cover is not satisfactory in noise reduction. Further, the resin-only cover is prone to charge static electricity, so that there is a high possibility of an IC crash, a head crash, etc. due to the static electricity. It is therefore necessary to provide protection against static electricity.

In the conventional magnetic disk drive, a printed wiring board on which a control circuit or the like for the disk drive is exposed to the outside of the housing. Accordingly, there is a possibility that electromagnetic waves generated from the printed wiring board could have adverse effects on the surroundings, e.g., an adverse effect on a pacemaker or an adverse effect on an unborn child in a pregnant woman.

SUMMARY OF THE INVENTION

It is therefore an object of the present invention to provide a disk drive having a resin cover which can provide electromagnetic protection and reduce noise from the disk drive.

In accordance with an aspect of the present invention, there is provided a disk drive comprising a housing having a base and a cover fixed to the base; a disk rotatably mounted in the housing and having a plurality of tracks; a head for reading/writing data on the disk; and an actuator for moving the head across the tracks of the disk; wherein the cover is composed of a molded resin and a metal sheet integrally embedded in the molded resin.

The cover is secured to the base by a plurality of screws. Preferably, the metal sheet of the cover is exposed at a portion where the screws are located. The metal sheet is a copper sheet or a steel sheet. The metal sheet may be formed as a meshed sheet. In this case, bonding strength between the metal sheet and the molded resin can be improved. Preferably, a noise absorbing member such as a polyurethane sheet is attached to the cover.

In accordance with another aspect of the present invention, there is provided a disk drive comprising a housing having a base and a first cover fixed to base; a disk rotatably mounted in said housing and having a plurality of tracks; a head for reading/writing data on the disk; an actuator for moving the head across the tracks of the disk; and a printed wiring board mounted below the base, on which a drive circuit is mounted; and a second cover fixed to the base so as to cover the printed wiring board; each of the first and second covers being composed of a molded resin and a metal sheet integrally embedded in the molded resin.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4A is a sectional view of a magnetic disk drive according to a third preferred embodiment of the present invention;

FIG. 4B is a plan view of the magnetic disk drive shown in FIG. 4A;

DETAILED DESCRIPTION OF THE PREFERRED EMBODIMENTS

Figure 1A:
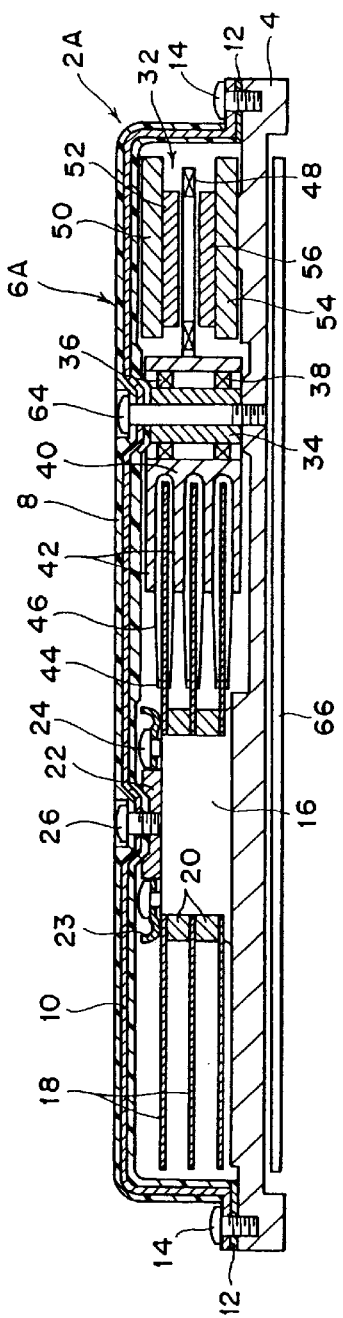
FIG. 1A is a sectional view of a magnetic disk drive according to a first preferred embodiment of the present invention.
Figure 1B:
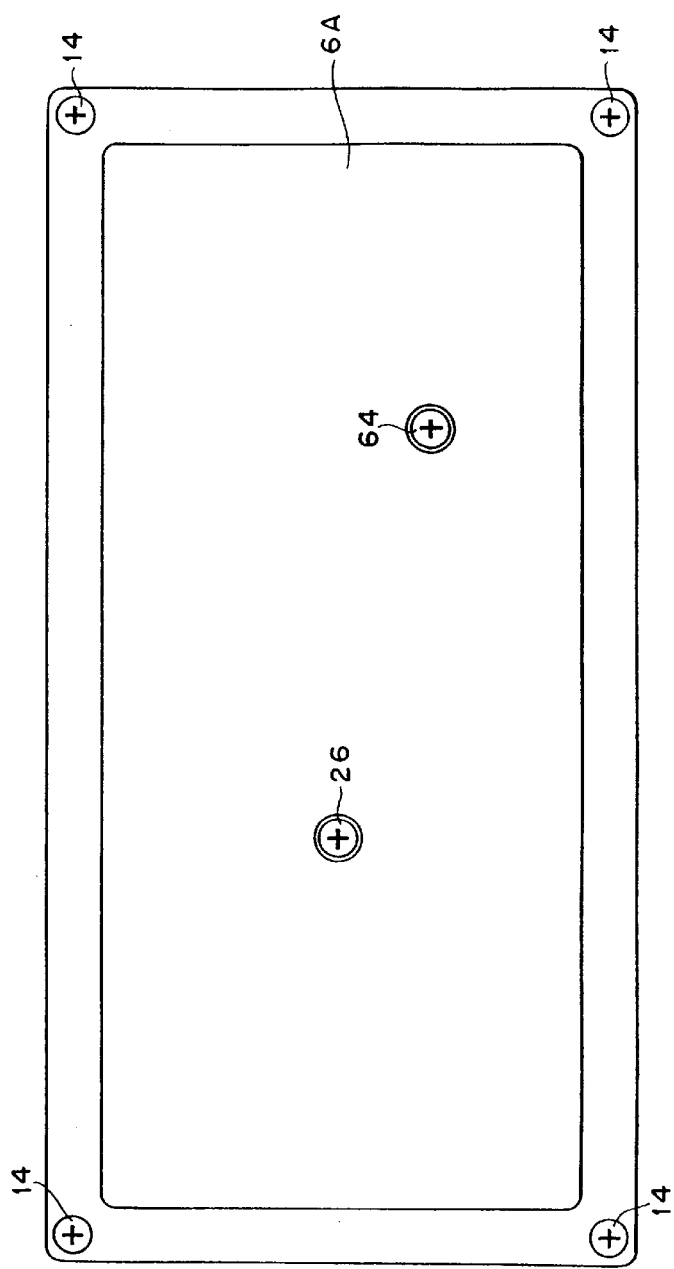
FIG. 1B is a plan view of the magnetic disk drive shown in FIG. 1A.

Various preferred embodiments of the present invention will now be described with reference to the drawings. Throughout the drawings, substantially the same parts are denoted by the same reference numerals. Referring to FIG. 1A, there is shown a sectional view of a magnetic disk drive according to a first preferred embodiment of the present invention. FIG. 1B is a plan view of the magnetic disk drive shown in FIG. 1A. Reference numeral 2A denotes a housing of the magnetic disk drive. The housing 2A includes a base 4 and a cover 6A fixed to the base 4 by a plurality of screws 14. A packing 12 is interposed between the base 4 and the cover 6A to seal the housing 2A.

The base 4 is formed of aluminum, for example. The cover 6A is composed of a molded resin 8 of polycarbonate, for example, and a solid metal sheet 10 integrally embedded in the molded resin 8. The metal sheet 10 is formed preferably of copper, but it may be formed of steel. The metal sheet 10 is formed by deep drawing of a metal into the shape of the cover 6A. The cover 6A is formed by first placing the metal sheet 10 preliminarily formed into a predetermined shape by pressing, casting, etc. into a given mold and next pouring a molten resin into the mold to thereby integrate the metal sheet 10 with the molded resin 8.

The cover 6A is characterized in that the copper sheet 10 is integrally embedded in the molded resin 8 to obtain an electromagnetic shielding effect. Further, since the metal sheet 10 is laminated in the molded resin 8, a damping effect is also obtained to contribute to a reduction in noise generated from the disk drive. In the case of using a steel sheet as the metal sheet 10, the weight of the cover 6A itself becomes larger than that in the case of using a copper sheet, so that the damping effect is improved, but the electromagnetic shielding effect is somewhat reduced as compared with the case of using a copper sheet. Further, in the case that only the electromagnetic shielding effect is intended, an aluminum sheet may be used as the metal sheet 10.

The configuration of the magnetic disk drive according to this preferred embodiment will now be described in brief with reference to FIGS. 1A and 2. A shaft 22 is fixed to the base 4, and a spindle hub 16 is provided on the shaft 22 so as to be rotatably driven by a DC motor. A plurality of magnetic disks 18 and spacers 20 are mounted on the spindle hub 16 in such a manner as to be alternately stacked. That is, the plural magnetic disks 18 are fixedly mounted on the spindle hub 16 by securing a disk clamp 23 to the spindle hub 16 by a plurality of screws 24, and are equally spaced a given distance by the spacers 20. A screw 26 is fixed to the shaft 22 from the upper side of the cover 6A.

Figure 2:
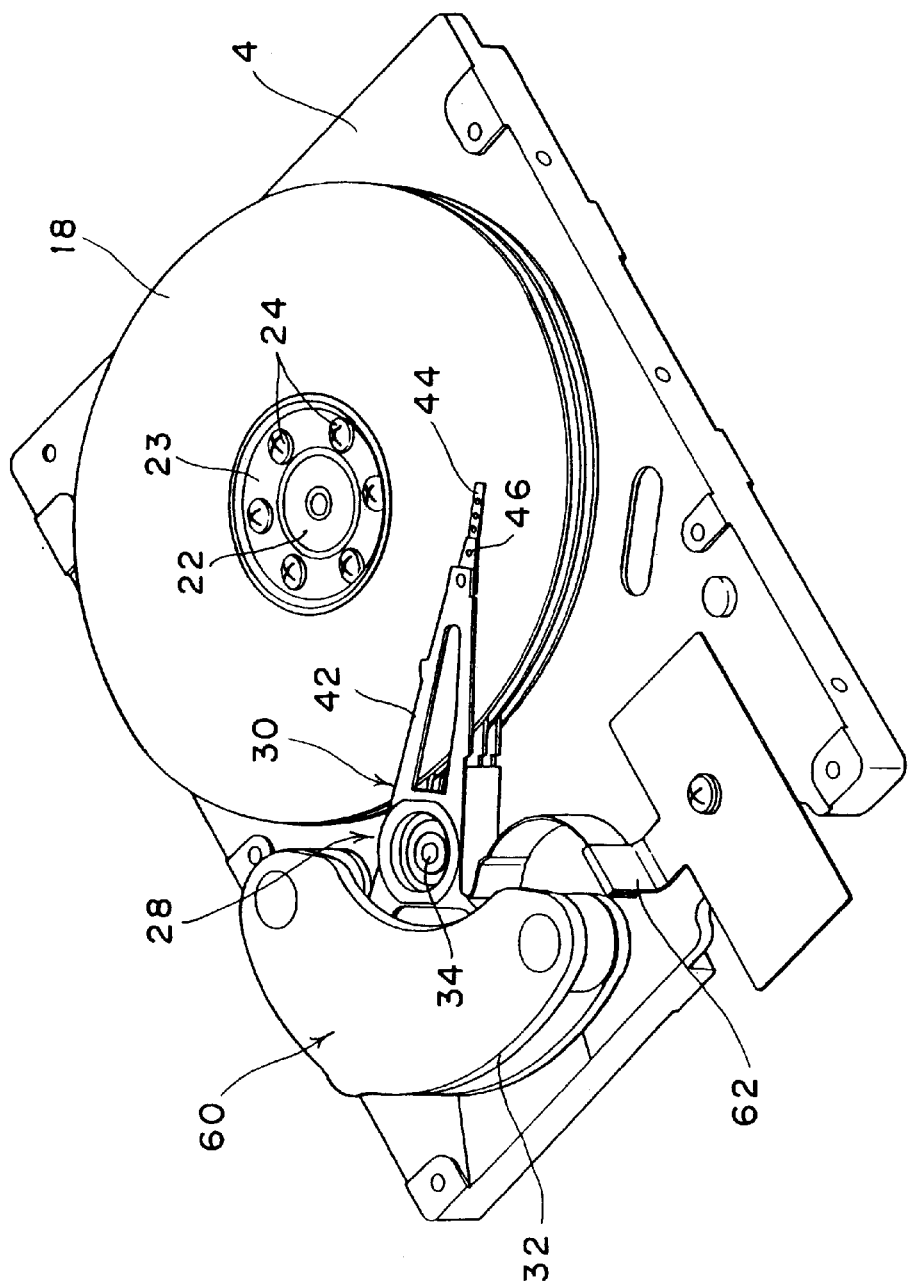
FIG. 2 is a perspective view of the magnetic disk drive with its cover removed.

Referring to FIG. 2, reference numeral 28 denotes a rotary actuator consisting of an actuator arm assembly 30 and a magnetic circuit 32. The actuator arm assembly 30 is rotatably mounted on a shaft 34 fixed to the base 4. The actuator arm assembly 30 includes an actuator block 40 that is rotatably mounted on the shaft 34 through a pair of bearings 36 and 38, a plurality of actuator arms 42 that extend from the actuator block 40 in one direction, and a plurality of suspensions 46 that are fixedly connected to the actuator arms 42. A magnetic head 44 is mounted on a front end portion of each suspension 46.

As shown in FIG. 1A, a coil 48 is supported on the opposite side of the actuator arms 42 with respect to the shaft 34. The magnetic circuit 32 includes an upper yoke 50, an upper magnet 52 fixed to the upper yoke 50, a lower yoke 54, and a lower magnet 56 fixed to the lower yoke 54. As shown in FIG. 1A, the coil 48 is inserted in a gap of the magnetic circuit 32 to constitute a voice coil motor (VCM) 60. A screw 64 is threadedly engaged into the shaft 34 from the upper side of the cover 6A.

Reference numeral 62 denotes a flexible printed circuit board (FPC) for supplying write signals to the magnetic heads 44 for and taking read signals from the magnetic heads 44. The flexible printed circuit board 62 is fixed at its one end to the side surface of the actuator block 40. As shown in FIG. 1A, a printed wiring board 66 on which a drive circuit such as a control circuit is mounted is provided outside the housing 2A under the base 4.

The molded resin 8 of the cover 6A preferably contains carbon or the like to have conductivity to some extent. Further, the metal sheet 10 is preferably exposed at its outer peripheral portion where the cover 6A is secured to the base 4 by the screws 14. With this configuration, static electricity in the molded resin 8 can be passed to the base 4 through the screws 14 securing the cover 6A to the base 4, thereby preventing charging of static electricity in the cover 6A.

Figure 3:
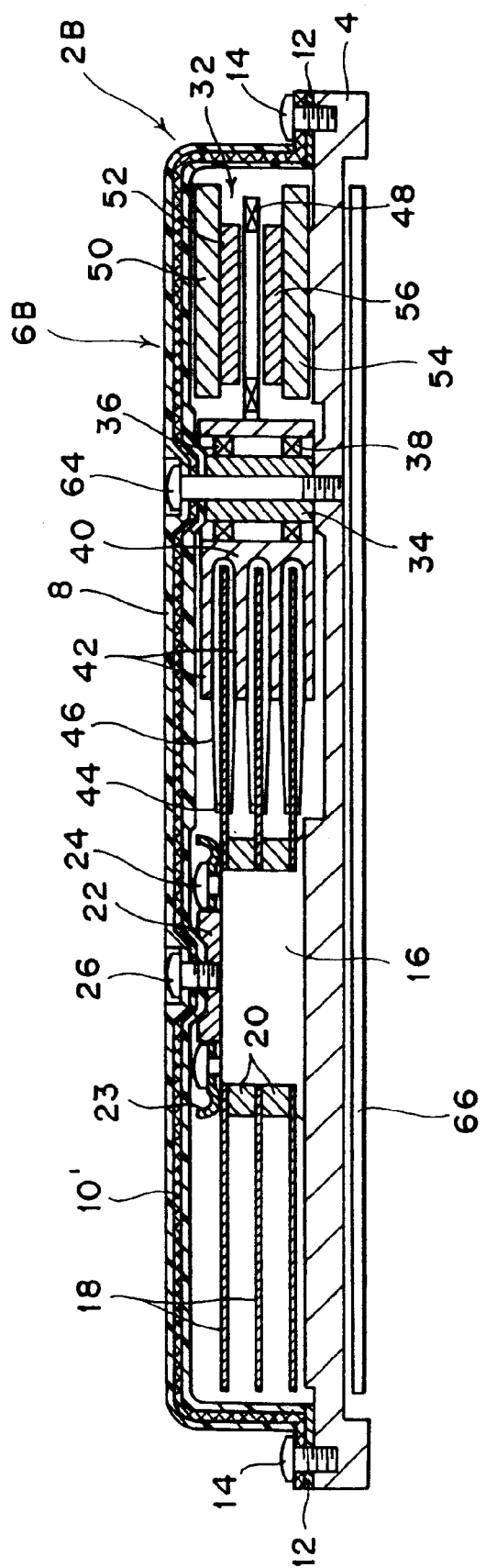
FIG. 3 is a sectional view of a magnetic disk drive according to a second preferred embodiment of the present invention.

FIG. 3 is a sectional view of a magnetic disk drive according to a second preferred embodiment of the present invention. Reference numeral 2B denotes a housing composed of a base 4 and a cover 6B fixed to the base 4. The cover 6B is composed of a molded resin 8 and a meshed copper sheet 10' integrally embedded in the molded resin 8. The meshed copper sheet 10' is formed by deep drawing into the shape of the cover 6B. By embedding the meshed copper sheet 10' in the molded resin 8, the bonding strength between the molded resin 8 and the meshed copper sheet 10' can be improved. The other configuration of this preferred embodiment is similar to that of the first preferred embodiment shown in FIG. 1A, so the description thereof will be omitted herein.

FIG. 4A is a sectional view of a magnetic disk drive according to a third preferred embodiment of the present invention, and FIG. 4B is a plan view of the magnetic disk drive shown in FIG. 4A. Reference numeral 2C denotes a housing composed of a base 4 and a cover 6C fixed to the base 4. The cover 6C is composed of a molded resin 8 and a solid metal sheet 10 integrally embedded in the molded resin 8 like the first preferred embodiment. The metal sheet 10 is formed of copper or steel.

In this preferred embodiment, a noise absorbing sheet 68 such as a polyurethane sheet is attached to the outer surface of the cover 6C. The noise absorbing sheet 68 can contribute to a further reduction in noise from the disk drive. The other configuration of this preferred embodiment is similar to that of the first preferred embodiment, so the description thereof will be omitted herein.

Figure 5:
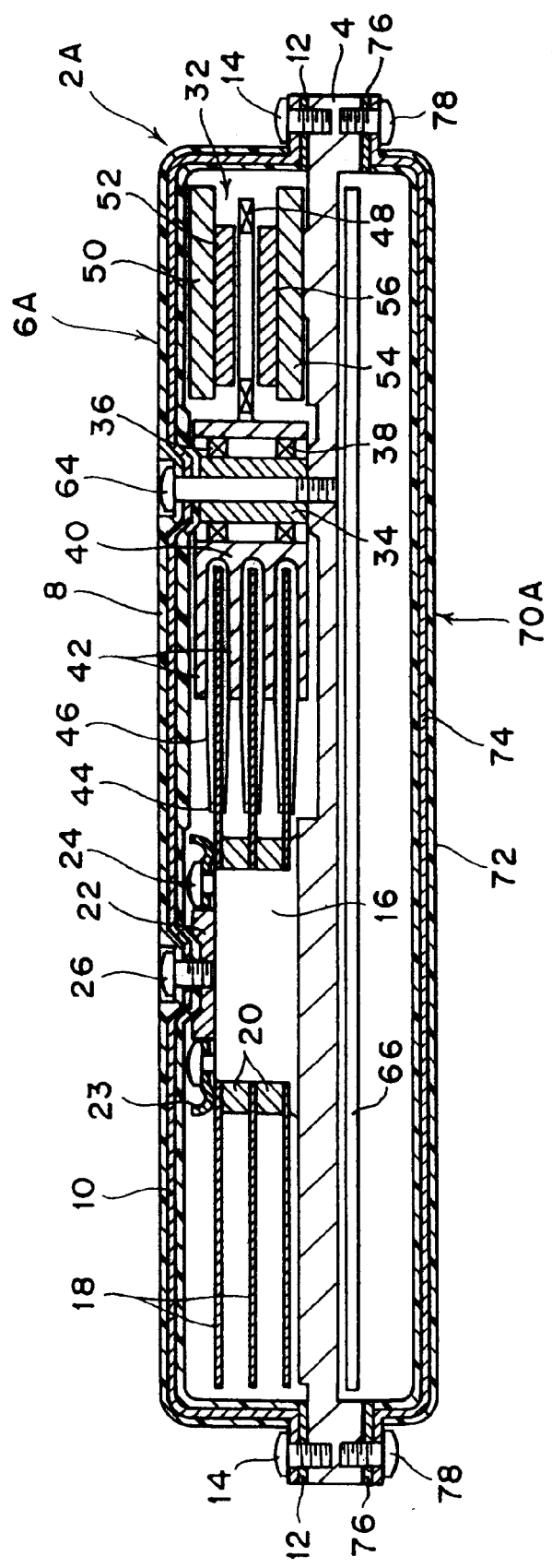
FIG. 5 is a sectional view of a magnetic disk drive according to a fourth preferred embodiment of the present invention.

Referring to FIG. 5, there is shown a sectional view of a magnetic disk drive according to a fourth preferred embodiment of the present invention. The magnetic disk drive according to this preferred embodiment includes another cover 70A for covering a printed wiring board 66 in addition to a housing 2A composed of a base 4 and a cover 6A similar to that of the first preferred embodiment. The cover 70A is fixed through a packing 76 to the base 4 by a plurality of screws 78. The cover 70A is composed of a molded resin 72 and a solid metal sheet 74 integrally embedded in the molded resin 72 like the cover 6A. The metal sheet 74 is formed of copper or steel. The solid metal sheet 74 may be replaced by a meshed metal sheet.

The printed wiring board 66 on which a drive circuit is mounted is covered with the cover 70A having the metal sheet 74. Accordingly, electromagnetic waves generated from the drive circuit can be shielded by the cover 70A, thereby reducing the leakage of the electromagnetic waves from the disk drive. Recently, attention has just been given to adverse effects of electromagnetic waves on the human body. For example, it is desirable to minimize the adverse effects of electromagnetic waves on pacemakers and the adverse effects of electromagnetic waves on pregnant women.

In view of these circumstances, this preferred embodiment is intended to reduce the adverse effects of electromagnetic waves from a magnetic disk drive installed in a mobile computer such as a notebook personal computer, especially when it is used by the above persons. Furthermore, the cover 70A can also shield external electromagnetic waves, thereby preventing malfunctioning of the disk drive due to the external electromagnetic wave which improves the reliability of the disk drive. The other configuration of this preferred embodiment is similar to that of the first preferred embodiment, so the description thereof will be omitted herein.

Figure 6:
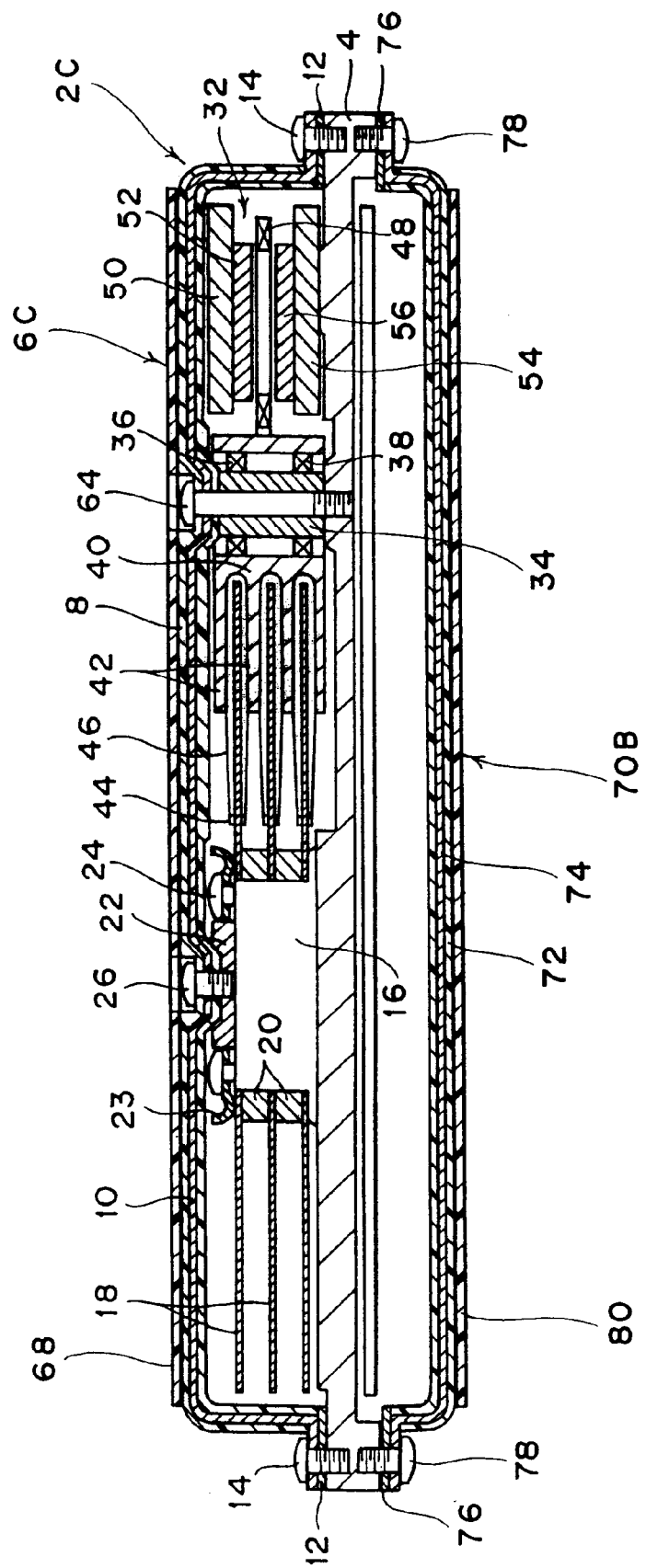
FIG. 6 is a sectional view of a magnetic disk drive according to a fifth preferred embodiment of the present invention.

Referring to FIG. 6, there is shown a sectional view of a magnetic disk drive according to a fifth preferred embodiment of the present invention. A cover 70B in this preferred embodiment is configured by attaching a noise absorbing sheet 80 such as a polyurethane sheet to the cover 70A in the fourth preferred embodiment shown in FIG. 5. A cover 6C in this preferred embodiment is similar to the cover 6C in the third preferred embodiment shown in FIG. 4A. By using a steel sheet as each of the metal sheets 10 and 74, the weight of each of the covers 6C and 70B can be increased as compared with the case of using a copper sheet, thereby improving a damping effect.

The noise absorbing sheets 68 and 80 respectively attached to the outer surfaces of the covers 6C and 70B function to reduce noise from the disk drive. Accordingly, in combination with the damping effect by the steel sheets 10 and 74, the noise from the disk drive can be further reduced. The other configuration of this preferred embodiment is similar to that of the first preferred embodiment, so the description thereof will be omitted herein.

According to the present invention, it is possible to provide a disk drive having a resin cover which can improve electromagnetic protection characteristics and reduce noise from the disk drive.

What is claimed is:

1. A disk drive comprising:

a housing enclosure defined by a metal base and a cover fixed to said base;

a disk rotatably mounted within said housing enclosure and having a plurality of tracks;

a head for reading/writing data on said disk; and an actuator for moving said head across said tracks of said disk, wherein said cover is composed of molded resin with a metal sheet integrally embedded therein, said metal sheet having a majority of both an upper surface and a lower surface covered by said molded resin of said cover;

wherein said cover is secured to said base by a plurality of screws, and said metal sheet of said cover is exposed at portions where said screws are located; and wherein said screws contact both said metal sheet and said base to electrically connect said metal sheet to said base through said screws.

2. A disk drive according to claim 1, wherein said cover is secured to said base by a plurality of screws, and said metal sheet of said cover is exposed at portions where said screws are located.

3. A disk drive according to claim 1, wherein said metal sheet is a copper sheet.

4. A disk drive according to claim 1, wherein said metal sheet is a steel sheet.

5. A disk drive according to claim 1, wherein said metal sheet is a meshed sheet.

6. A disk drive according to claim 1, wherein:

said cover includes an upper surface, a side surface surrounding said upper surface that is generally perpendicular to said upper surface, and a flange positioned on the lower end of said side surface, where said flange is generally parallel to said upper surface; and said metal sheet is embedded with said upper surface, said side surface and said flange.

7. A disk drive according to claim 6 wherein:

said cover is secured to said base by a plurality of screws; and a portion of said metal sheet located at said flange is exposed to make contact with said screws.

* * * * *